P. T. WOODLAND.
CANE HARVESTER.
APPLICATION FILED APR. 6, 1918.

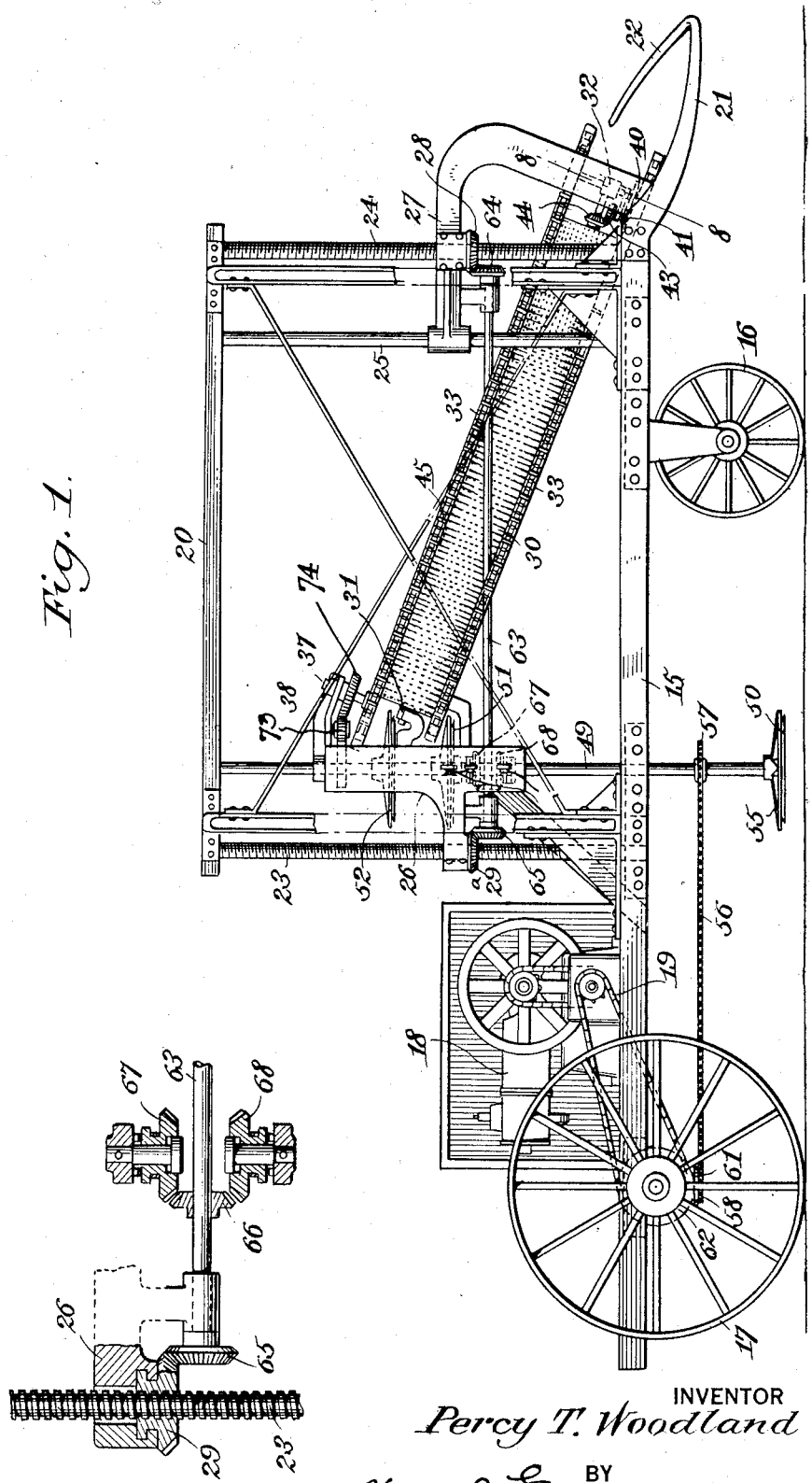

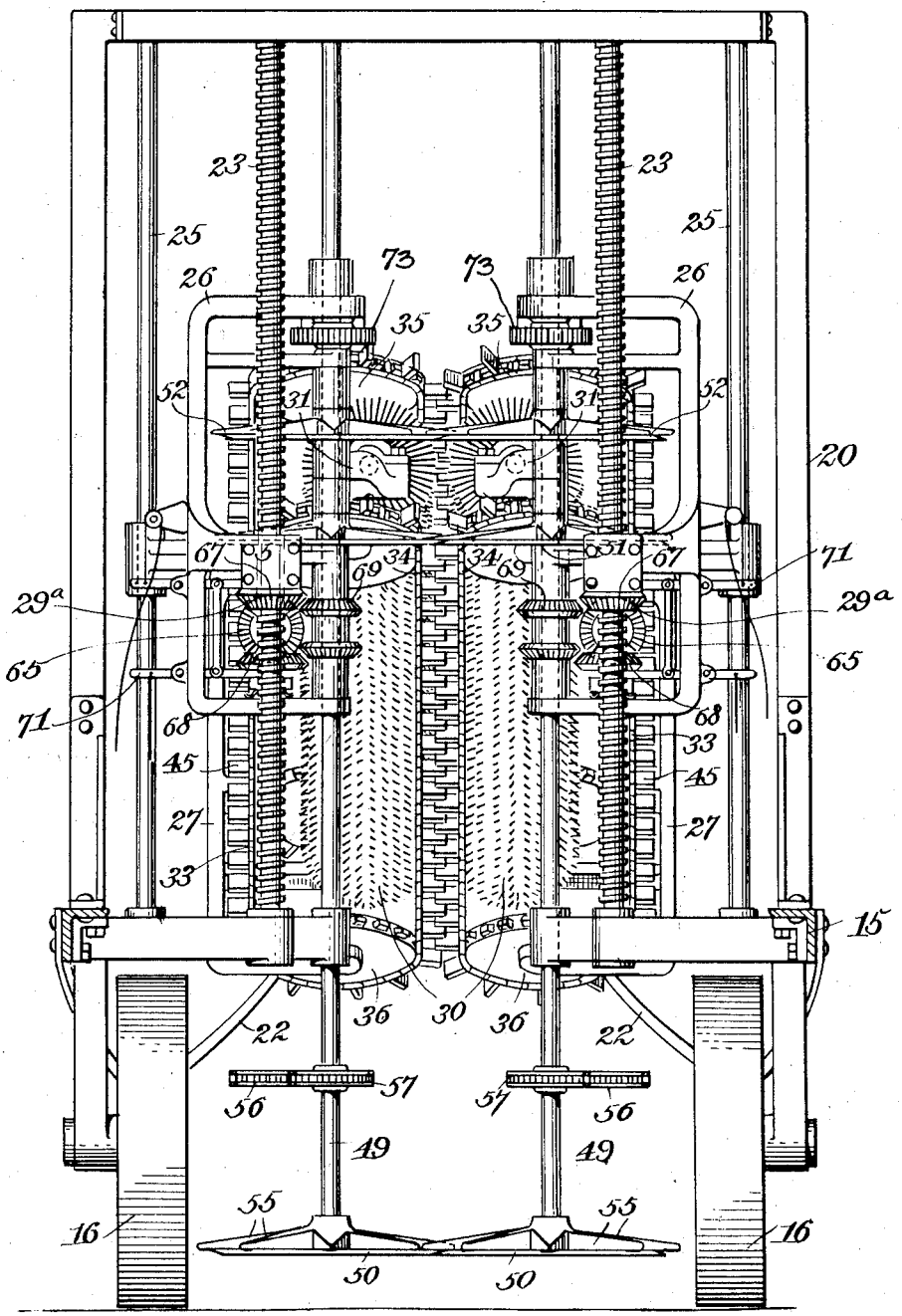

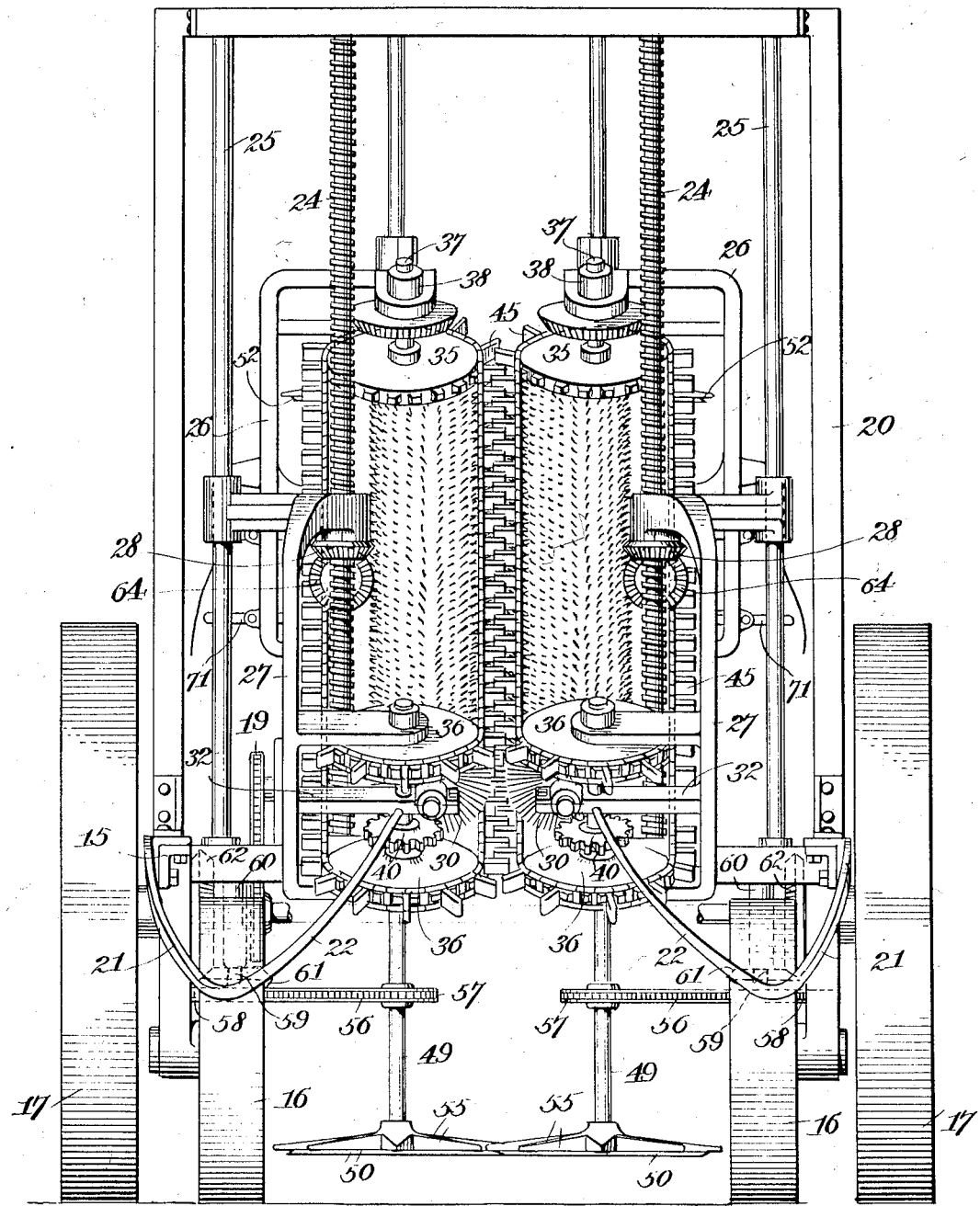

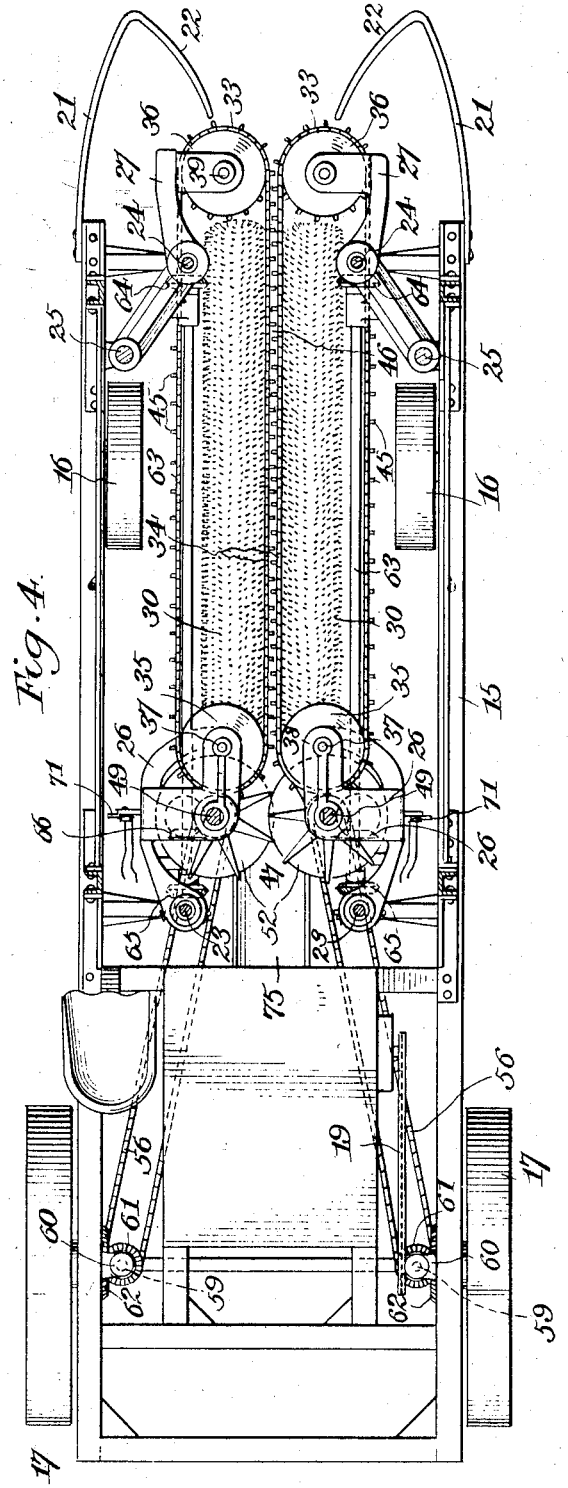

1,365,213.

Patented Jan. 11, 1921.
5 SHEETS—SHEET 5.

INVENTOR,
Percy T. Woodland.
BY
Victor J. Evans
ATTORNEY

UNITED STATES PATENT OFFICE.

PERCY T. WOODLAND, OF NEW YORK, N. Y.

CANE-HARVESTER.

1,365,213.  Specification of Letters Patent.  Patented Jan. 11, 1921.

Application filed April 6, 1918. Serial No. 227,011.

*To all whom it may concern:*

Be it known that I, PERCY T. WOODLAND, a subject of the King of Great Britain, residing at New York, in the county of New York and State of New York, have invented new and useful Improvements in Cane-Harvesters, of which the following is a specification.

This invention relates to improvements in machines for harvesting sugar cane and the like, the primary object being to provide a machine by means of which the cane can be rapidly cut close to the ground, stripped and topped.

An important object of the invention resides in the provision of means for exerting slight pressure in an upward direction against the stalks while in their normal growing or standing positions, the said means serving to strip the stalks while in such positions and mechanism for finally severing the stalks at the ground line and simultaneously topping the same.

A still further object of the invention resides in the provision of a machine which will be adjustable to meet all ordinary conditions, incorporating therein mechanism whereby the stalks can be uniformly grasped irrespective of their length and then uniformly subjected to the simultaneous action of a plurality of cutters, the latter serving to cut the stalks near the ground, topping the stalks and also cutting the same beneath the tops and distributing such cut portions to a receptacle which is designed to form a part of the machine.

In harvesting it is appreciated as being common in the art to provide gathering mechanisms which are succeeded by cutters and the latter succeeded by conveyers, strippers, toppers and various other instrumentalities for subjecting the cane for treatment. Machines of this class have been entirely inefficient for the purpose in that the work of handling the cane is of an uncertain character usually cumbersome and complicated and inadequate for a proper gathering of the cane, stripping and topping and cutting thereof. Among other objects in view, I have devised a machine in which the above disadvantages can be satisfactorily eliminated and the cane subjected first to the action of a grasping mechanism which will hold the same for a certain space of time in their standing or growing positions, stripping the cane while grasped, and then releasing the cane and subjecting the same to a cutting mechanism which will simultaneously operate to cut the same near the ground line, divide the same in other fragments if desired, and satisfactorily top it.

With the above and other objects in view which will appear as the nature of the invention is better understood, the same consists in the improved construction and novel arrangement of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1 is a side view of the harvester.

Fig. 2 is a rear view thereof.

Fig. 3 is a front view.

Fig. 4 is a plan view of the machine.

Fig. 6 is a conventional plan view thereof.

Fig. 7 is a vertical section on line 7—7 of Fig. 6.

Fig. 9 is a vertical section through a part of the carriage structure showing the raising and lowering means therefor at the rear of the machine.

Fig. 11 is a fragmentary plan view of a slightly modified form of the upper cutters.

Figure 8:
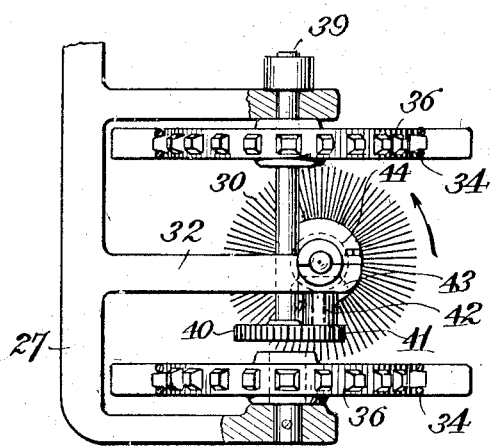
Fig. 8 is a section taken approximately on line 8—8 of Fig. 1.
Figure 10:
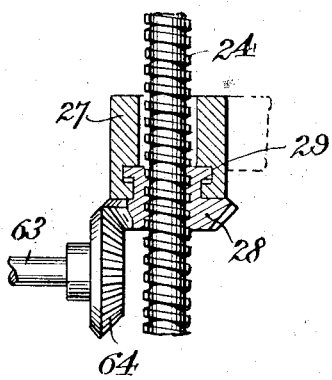
Fig. 10 is a section through a portion of the carriage structure at the front of the machine.

I do not desire to limit myself in any particular to the manner in which the machine is designed to be moved or propelled through the field, but appreciate the desirability of using a self propelling mechanism such as a gas engine whose power can be transmitted to the driving axle of the machine and the power also utilized to operate the working instrumentalities of my improved mechanisms. For this reason, use is made of a portable frame 15 which is mounted upon front supporting wheels 16 and rear supporting wheels 17. On the frame is a gas engine as conventionally illustrated at 18, the same including a power transmitting chain 19 which is geared to the axle of the rear wheels 17, so that the latter will be placed in motion when the engine is operated.

The frame 15 supports a super-structure 20, at the front of which are gathering fingers 21—21 having guiding branches 22, which are curved toward each other and in the direction of the longitudinal center of the machine so that the stalks will be satisfactorily collected, and taken verticalwise to the machine. In the super-structure 20, and also in the frame 15 are journaled vertical worm-screws 23—23 and 24—24. Adjacent the front screws 24 and fixedly supported in the frame 15 and super-structure 20 respectively are guide-rods 25—25. Beneath the super-structure 20, is a vertically movable carriage, the same comprising heads 26—26, at the rear of the machine and heads 27—27 adjacent the front of the machine. The heads 27—27 freely pass over the worm screws 24 and they are provided with bevel gear wheels 28 swiveled to the heads as at 29, and threaded internally to co-act with the threads of said screws. The heads 26—26 adjacent the rear of the machine are provided with bevel gears 29ª, which are internally threaded to co-act with the worm screws 23—23 as illustrated in Fig. 9. In this manner the carriage structure, which principally comprises the mentioned heads can be raised and lowered between the frame 15 of super-structure 20.

Journaled for rotation in the carriage are downwardly inclined brushes 30—30, the same being arranged in parallel relation and preferably spaced apart for a sufficient extent to permit of the passage of the stalks therebetween. The space between said brushes occupies the same longitudinal position as the space between the surfaces 22—22 of the gathering fingers 21. While the brushes are intended in a measure to strip the stalks they have the further office of means for exerting a slight upward pressure against the stalks, it being understood that the machine is designed to strip the stalks while the latter are standing in their normal growing positions and at the same time maintaining a standing position of said stalks for a certain duration of time. The purpose of this arrangement will be more fully explained hereinafter. These brushes have the rear ends of their shafts journaled in brackets 31, on the heads 26 while at the front ends said shafts are journaled in bearings 32 on the heads 27—27.

The stalk grasping and retaining mechanism comprises endless chains 33—33, which are arranged side by side with their leads 34, in vertical alinement with the space between the stripping brushes 30—30. Each of these chains pass over a sprocket wheel 35—35, adjacent the rear of the machine while at the opposite end each chain passes over a sprocket gear wheel 36. The shafts 37, of the sprocket wheel 35, are mounted idly in bearing brackets 38, on the heads 26. The shafts 39, of the sprocket wheel 36, are provided with spur gears 40, which mesh with spur gears 41, on power transmitting shafts 42, the latter having bevel gear wheels 43, which mesh with similar gear wheels 44, on the shafts of the stripping brushes 30. In this manner, it is manifest that when the stripping brushes are placed in motion, power will be simultaneously transmitted to the grasping chains 33—33. A gearing between said chains and the mentioned stripping brushes is designed to cause the stripping brushes to rotate in opposite directions so that as the stalks pass between the brushes, pressure in an upward direction will be exerted thereagainst. The chains 33, are provided with fingers 45, and as illustrated the fingers on the inner leads of one of said chains are adapted to co-act with the corresponding fingers on the inner lead of the companion chain so that stalk accommodating spaces 46, are formed between said fingers.

The chains 33—33, open onto cutting mechanism 47, a throat 48, being arranged between the discharge ends of the chains and said cutting mechanism in order that the stalks are free to be subjected to the action of said cutting mechanism while said stalks are in their normal vertical positions. The mechanism designed herein is adapted to permit bunches of stalks to enter the spaces between the adjacent fingers 45, on the respective chains 33, and remain in their normal standing or growing positions for that duration of time which is necessary to permit the cutting mechanism to be brought into action. The said cutting mechanism comprises parallel spaced shafts 49—49, to which the heads 26—26, are suitably keyed for sliding movement. These shafts are suspended in bearings in the frame 15, and superstructure 20, and at their lower ends each is provided with a cutting blade 50. These blades are arranged to slightly overlap each other and are adapted to cut the stalks immediately at the ground line. At a point directly behind the throat 48, each of said shafts is provided with a cutter 51, and a superposed cutter 52. The companion cutters 51, are also arranged in overlapping relation, likewise the cutters 52. The cutters 52, are provided with radial gathering fingers 53, and as illustrated said cutters are of disk formation and the fingers 53, arranged to extend slightly beyond the peripheral edges of said cutters whereby in rotation of the cutters, the stalks as they pass from the discharge throat 48, are brought into effective impinging contact with the overlapped edges of said cutters. In this manner a clean shearing action is created and the stalks uniformly and effectually severed. It is preferred that similar radial fingers 54, be arranged superposed with respect to the cutter disks 51, and like fingers 55, arranged superposed with respect to the lower cutting disks 50. By arranging the disks one above another in sets as above specified the stalks are taken into the immediate presence of the disks in parallel relation to the axes of the latter and a simultaneous severing of the stalks is thus brought about.

Power is transmitted to the shafts 49—49, by means of endless chains 56. These chains pass over sprocket gear wheels 57, on the shafts and at the opposite ends they pass over sprocket gears 58, on stub shafts 59. The mentioned shafts 59, are journaled in brackets 60, on the frame 15, and as illustrated they are provided with bevel gear wheels 61, which mesh with driving gears 62, on the rear axle which connect the supporting wheels 17.

Motion is intended to be transmitted to the worm screws by providing shafts 63, which are journaled in the heads 26—26, and 27—27. These shafts are provided with bevel gear wheels 64, which mesh with the bevel gear wheels 28—28, on the worm-screws 24. At the opposite ends said shafts are provided with bevel gear wheels 65, which mesh with the bevel gear wheels 29$^a$, on the worm screws, 23. Each of these shafts is provided with a bevel gear wheel 66, which is associated with relation to clutch gears 67 and 68, supported by the heads 26. Said clutch gears are adapted to be selectively thrown into operation with the pinion 66, and also with pinions 69 and 70, on the cutter shafts 49. In this manner it will be observed that by operating said pinions 67 and 68, through the clutch devices 71, the worm screws can be made to revolve in the desired direction and will thus cause the heads 26—26 and 27—27, to be raised or lowered to suit the conditions of the work to be operated upon.

The chains 33—33 are positively driven by means of the driven shafts 37 at the upper ends of the top chains, the same being provided with bevel gears 72 which mesh with pinions 73 supported from the heads 26—26. The cutter shafts 49—49 are provided with spur gears 74 which mesh with said pinions 73 as shown in Fig. 1.

In the modified form of the invention shown in Fig. 11, the mating cutting disks 75—75 are provided with super-posed fingers 76, whose free terminals 77 are disposed beyond the coacting edges of the disks and as illustrated, they are provided with curved or hook shaped portions 78 which operate to positively grasp the stalks as they leave the throat 48 and thereby advance said stalks into positive contact with the cutting edges of said disks.

Figure 12:
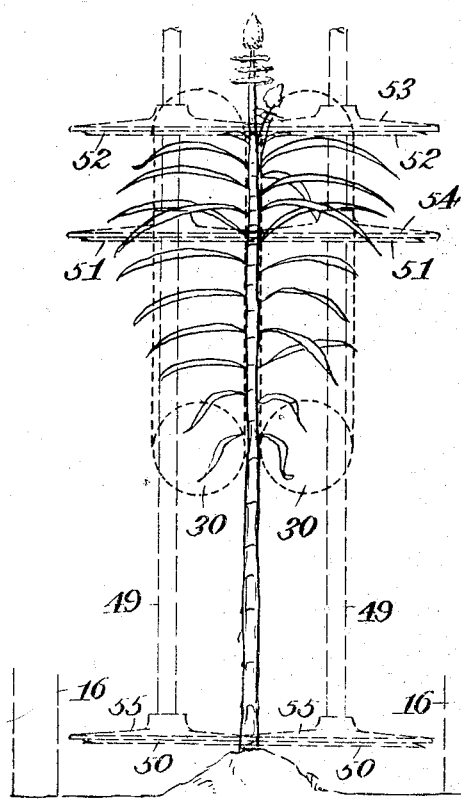
Fig. 12 is a conventional illustration of the cutting and topping mechanism.
Figure 5:
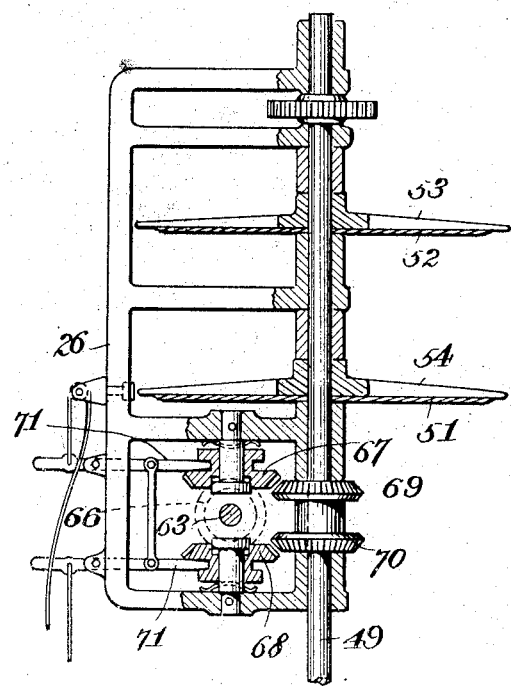
Fig. 5 is a vertical section with parts in elevation, of the upper cutters.

By providing the disks 51—51 and 52—52 as diagrammatically illustrated in Fig. 12 it will be observed that they are designed to operate upon the tops of stalks of relatively different lengths, the longer stalks projecting above the top disks 52—52, perhaps to a greater extent than adjacent stalks. In order that all valuable portions of the stalks can be saved during the topping operation, it will be observed that those portions of the stalks which are disposed between the respective disks 51—51, and 52—52 will be saved and the same are adapted to be taken into the receptacle (not shown) and designed to be arranged at the rear of the frame 15. Such portions of the stalks may be conducted to such receptacle by means of a suitable chute 75.

What I claim as new is:

1. In a cane harvester, the combination with a portable frame including gatherers, movable means located between the gatherers for maintaining a temporary normal standing position of the stalks, cutting means following in the course of the movable means and including sets of revolving knives, the movable means serving to discharge the stalks while in their standing positions to the action of said cutting means and gathering fingers operating to advance the stalks into active engagement with said cutting means and mounted upon the shafts of said knives.

2. A cane harvester comprising movable means for grasping the stalks while the latter are standing, rotary and longitudinally disposed stripping brushes operating to exert pressure in an upward direction against the stalks while they are grasped by said movable means, cutting mechanism adapted to follow in the path of said grasping movable means, and a vertically adjustable carriage supporting said brushes, the grasping means and said cutting mechanism.

3. A cane harvester comprising gathering means, movable grasping means for raising and maintaining the stalks in upright positions, rotary stripping brushes disposed longitudinally and extending downwardly and forwardly adjacent to the movable grasping means, and sets of cutting disks carried in rear of the grasping means and the brushes, and upper cutting disks for coöperation with the grasping means.

4. In a cane harvester, the combination in a wheel-supported frame, gathering fingers extending forwardly therefrom and having at their forward ends inwardly and rearwardly extending spaced guides, endless movable grasping means arranged longitudinally in the frame and having inner opposed stretches in alinement with said space between the guides, longitudinal parallel stripping brushes extending downwardly and forwardly in the frame adjacent the said grasping means, and cutting knives having inner coöperating portions arranged in line with and in rear of the space between the inner stretches of the movable grasping means.

5. A cane harvester comprising a pair of longitudinal rotary stripping brushes extending at a downward and forward angle with relation to the ground line and adapted to exert a constant upward pressure against the stalks, means for grasping the stalks and for holding the same in relatively stationary positions between said brushes, and horizontally disposed cutters disposed with relation to the brushes to permit the stalks while in upright positions to be subjected to the action of said cutters.

6. A cane harvester comprising a wheel-supported frame, a carriage movable vertically on said frame, means for adjusting and adjustably fixing said carriage, forward spaced gathering guides carried by the frame, and movable grasping means and movable stripping means carried by the vertically movable carriage and extending downwardly and forwardly in parallel relation to the said gathering means, and cutting means also carried by the carriage and having lower coöperating knives and upper coöperating knives.

7. In a cane harvester, the combination of a wheeled frame, gathering means at the forward end thereof, endless movable belts having spaced inner stretches and coöperating means thereon for engaging stalks and also having the space between said inner stretches in line with the space between said gathering means, longitudinal rotary stripping brushes parallel to said inner stretches of the grasping belts; said grasping belts and brushes inclined downwardly and forwardly to said gathering means, and cutting means having members arranged to coöperate with each other at points in rear of the space between the grasping belts and the stripping brushes.

In testimony whereof I affix my signature.

PERCY T. WOODLAND.